Jan. 13, 1970   J. F. DARROW   3,490,042
DIRECT CURRENT MEASURING REACTANCE ARRANGEMENT
Filed Dec. 19, 1966

INVENTOR.
JAMES F. DARROW
BY
R. H. Quist
ATTORNEY

United States Patent Office 3,490,042
Patented Jan. 13, 1970

3,490,042
DIRECT CURRENT MEASURING REACTANCE ARRANGEMENT
James F. Darrow, South Daytona, Fla., assignor to General Electric Company, a corporation of New York
Filed Dec. 19, 1966, Ser. No. 602,909
Int. Cl. G01r 33/00
U.S. Cl. 324—117      2 Claims

ABSTRACT OF THE DISCLOSURE

Duplicate saturable magnetic cores (which may be split) are placed about a direct current carrying conductor. Similar input coils on each core (serially connected but reversely wound) are used to saturate the cores in mutually opposite directions at regular intervals by current from a pulse generator. During the time bteween these saturating pulses, current flow in the conductor tends to drive one core further into saturation, but changes the magnetization of the other core. Similar output coils on each core (serially connected and wound in the same direction) are connected to an ammeter. The core in which there is a change in flux caused by the current in the conductor will have a current induced in its output coil which is proportional to the current in the conductor and indicative of its direction.

BACKGROUND OF THE INVENTION

This invention relates generally to direct current responsive devices and more particularly to a device inductively coupled to a direct current carrying conductor.

The measurement of a direct current in a conductor is customarily performed by connecting an ammeter to the conductor so that all or a certain fraction of the current passes through the instrument. Measurement of direct current by electromagnetic induction has also been performed (see for example U.S. Patent 2,915,707). Electromagnetic induction has the advantage of not requiring a direct connection to the direct current carrying conductor, and by the use of split cores does not require breaking the circuit of the conductor to make a measurement. Previous inductive systems, however, have required a source of alternating current for operation.

SUMMARY

It is a object of this invention to provide a system responsive to a direct current in a conductor utilizing a direct current source for operation and capable of indicating the existence, magnitude, and polarity of the direct current in the conductor.

In a preferred form of the invention, duplicate saturable magnetic cores having respectively similar input and output coils wound thereon are placed about a conductor intended to carry direct current. A pulse generator powered by a direct current source is connected to the input coils to provide, at intervals current in a pulse sufficient to completely magnetize the cores. The input coils are serially connected but reversely wound so that the cores are saturated in mutually opposite directions. At the termination of each input pulse the current in the conductor within the core begins to magnetize one of the cores in the opposite direction at a rate proportional to the current in the conductor. The output coil of this core will have a current induced also proportional to the current in the conductor. To the output coils may be connected a variety of circuits, for example, to indicate the presence of current in the conductor, to indicate the magnitude of the current, or to open a circuit breaker in the event the current is excessive. The polarity of the current in the conductor is easily determined by serially connecting the output coils. The direction of the induced current then corresponds to the direction of the current in the conductor.

Since the device is powered by direct current it lends itself to a portable unit. In a portable unit improved utility may arise by employing split cores so that the current in a conductor can be measured without disconnecting the conductor.

DESCRIPTION OF THE PREFERRED EMBODIMENTS

Throughout the figures the same identifying numbers are used where similar parts are referred to.

Figure 1:
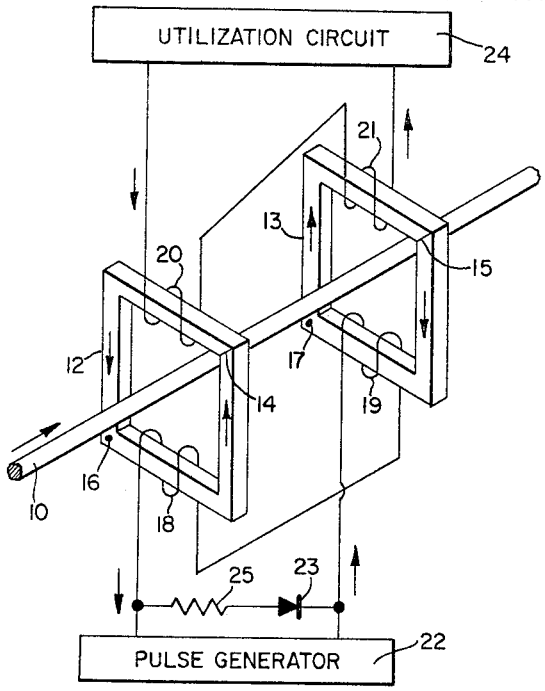
FIGURE 1 is a schematic of one embodiment of the invention.

Referring now to FIGURE 1, conductor 10 may be carrying current in either direction although the direction indicated by the arrow will first be assumed. Duplicate saturable magnetic cores 12 and 13 surround conductor 10. Cores 12 and 13 are split at corners 14 and 15 respectively, and are provided with hinges 16 and 17 respectively; to permit placing them about conductor 10 without disconnecting conductor 10.

Duplicate input coils 18 and 19 on cores 12 and 13 respectively are serially connected, but wound in opposite directions. Duplicate output coils 20 and 21 on cores 12 and 13 respectively are also serially connected, but are wound in the same direction.

When a current is passed through input coils 18 and 19 in the direction indicated by the arrows, a magnetomotive force is produced which tends to magnetize cores 12 and 13 in the directions indicated by the arrows on these cores. In accordance with the invention, current from pulse generator 22 sufficient to completely magnetize or saturate cores 12 and 13 is passed through input coils 18 and 19. Moreover, this current is applied in a short duration pulse of high intensity. It should be noted that while coils 18 and 19 are serially connected, they could be connected to pulse generator 22 in parallel.

When conductor 10 happens to be carrying a current in the assumed direction indicated by the arrow, it can be seen that it will tend to produce flux in core 13 in the same direction as that produced by input coil 19. Since core 13 is already saturated, no further change in flux will result due to the influence of the current in conductor 10. In core 12, on the other hand, the current in conductor 10 produces a flux in the opposite direction from that produced by input coil 18. Consequently, as soon as the saturating current pulse in input coil 18 ceases, flux will change in core 12 in the direction opposite from that indicated by the arrows on this core. The change in flux in core 12 will induce a current in output coil 20 in the direction indicated by the arrow.

In the event cores 12 and 13 do not have square hysteresis loops, diode 23 and current limiting resistor 25 may be shunted across input coils 18 and 19 to minimize the effects of nonlinearity.

It can be seen that if conductor 10 were carrying current in the other direction (opposite from the direction indicated), flux would change in core 13 instead of core 12, and a current would be induced in coil 21 in the direction opposite from that indicated by the arrow. In other words, the direction or polarity of the current in conductor 10 determines the direction of current flow in the circuit including output coils 20 and 21.

It should be noted that the magnitude of the current in the output circuit will be directly proportional to the magnitude of the current in conductor 10. When no current flows in conductor 10, none will flow in the output circuit. The latter result occurs even though upon termination of the saturating pulse some change in flux occurs in the reverse direction. Since equal and opposite changes occur in the two cores, no net induced current results.

Figure 2:
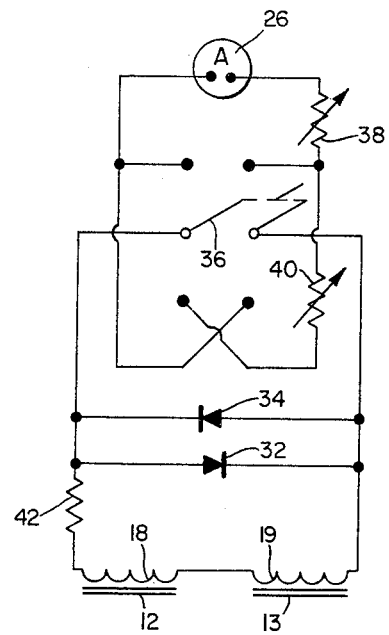
FIGURE 2 is a schematic of a circuit utilizing the output of FIGURE 1.

Although separate utilization circuits could be provided for output coils 20 and 21, it is generally more convenient to provide a single circuit. In FIGURE 2 output coils 20 and 21 on cores 12 and 13 respectively are illustrated connected to a circuit having ammeter 26 which can be calibrated to read in terms of the current in conductor 10. Current detectors other than ammeter 26 may also be used.

Diodes 32 and 34 are provided to shunt past ammeter 26 the high current induced in coils 20 and 21 during the saturating pulses produced by the pulse generator. The current induced in the output coils because of the flow of current in conductor 10, however, is relatively smaller. By choosing a suitable number of turns for output coils 20 and 21 the voltage of the current induced by conductor 10 can be less than the breakdown impedance of diodes 32 and 34 in the forward direction assuring that all this current will pass through ammeter 26, and none will be shunted.

Double pole, double throw switch 36 is provided to permit ammeter 26 to be of the type which reads in one direction only (giving a larger scale and greater resolution), instead of a meter which would read current in either direction.

In use, meter 26 is calibrated for current in one direction with switch 36 in the upward position using calibrating resistor 38 for adjustment. Switch 36 is then moved to the downward position (suitable for current in conductor 10 in the other direction). Adjustable resistor 40 is then used to again calibrate ammeter 26 so that in future use switch 36 can be moved from one position to the other without further calibration. When cores 12 and 13 are placed over conductor 10 with this arrangement, if the current is flowing in the wrong sense for reading on ammeter 26, switch 36 is merely reversed. Resistor 42 functions only as a current limiting resistor.

Pulse generator 22 can be a monostable pulse generator, for example of the type shown in FIGURE 13.55 of the 7th edition of "GE Transistor Manual."

Figure 3:
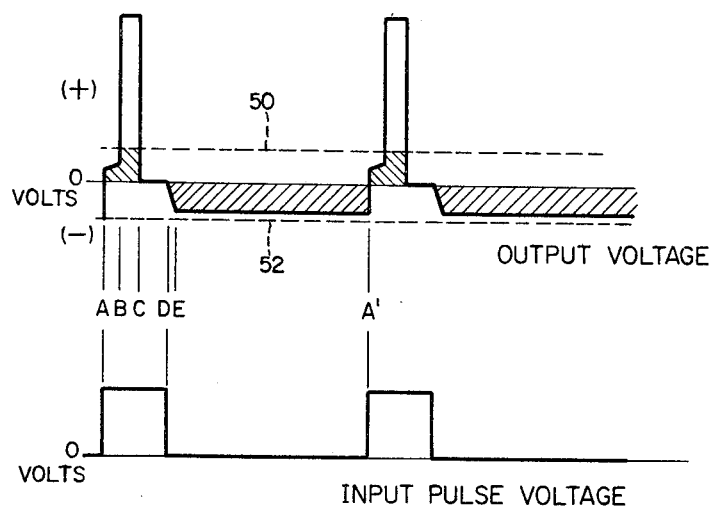
FIGURE 3 illustrates the waveforms of the voltage in the coils.

A fuller understanding of the operation of this invention, and particularly the circuitry of FIGURE 2, will be achieved from the following discussion referring to FIGURE 3. As indicated in the lower portion of the figure, pulses of current produced by pulse generator 22 have a square voltage waveform in input coils 18 and 19. At point A, a current pulse of positive voltage begins, and at point D it terminates. Flux changes in core 12 (continue to use the direction of current first assumed in conductor 10 and indicated in FIGURE 1) in the interval from A to C at which point core 12 is saturated. In the output voltage waveform therefore, (in the upper portion of FIGURE 3) the voltage of the induced current drops to zero at point C and remains there until the end of the saturating pulse (point D). The change in voltage level from point A to point B is the result of inductive effects.

As was previously pointed out, diodes 32 and 34 each have an impedance in the forward direction which is overcome at a particular voltage level. These voltage levels are indicated in FIGURE 3 by broken lines 50 and 52 respectively. Ammeter 26, because of this arrangement, will only carry current at voltage levels within the range of broken lines 50 and 52. When the voltage of the current rises above the broken line, the remaining current passes through the appropriate diode.

In FIGURE 3, for example, the shaded area is representative of the current which passes through ammeter 26. Because the current induced by conductor 10 is passing through ammeter 26 for a longer period than that induced by pulse generator 22 (as can be seen by comparing the shaded areas above and below the zero voltage line) the meter effectively reads only the current induced by conductor 10.

For current flow in conductor 10 in the opposite direction, the polarity of the voltages in the upper portion of FIGURE 3 is reversed.

While particular embodiments of direct current responsive devices have been shown and described, it will be obvious that changes and modifications can be made without departing from the spirit of the invention and the scope of the appended claims.

What is claimed as new and desired to be secured by Letters Patent of the United States is:

1. In a direct current sensing device, the combination comprising:
    (a) first and second magnetizable core members arranged to surround a conductor carrying an unknown current;
    (b) first and second input windings wound, respectively, on said first and second core members;
    (c) a source of unipotential current pulses connected, respectively, to said first and second input windings to completely magnetize said first and second cores in mutually opposite directions upon the occurrence of a pulse;
    (d) first and second output windings wound on each of said core members whereby passage of direct current through said conductor in either direction will induce current in one of said output windings responsive to the magnitude of said conductor current;
    (e) a current detector coupled to said first and second output coils, said current detector comprising an ammeter and means coupled thereto for bypassing portions of the output coil signals which are in excess of a predetermined amplitude.

2. A device according to claim 1 wherein said means comprise two reversely poled diodes connected in parallel with said ammeter.

References Cited

UNITED STATES PATENTS

| | | | |
|---|---|---|---|
| 2,780,782 | 2/1957 | Bright | 307—88 XR |
| 3,132,256 | 5/1964 | Giel | 307—88 |
| 2,494,206 | 1/1950 | Ross | 324—117 XR |
| 2,584,800 | 2/1952 | Grisdale | 324—110 |
| 2,676,300 | 4/1954 | Hirsch et al. | 324—115 XR |
| 2,760,158 | 8/1956 | Kerns | 324—117 XR |
| 2,892,155 | 6/1959 | Radus et al. | 324—117 |
| 3,135,911 | 6/1964 | Van Allen | 324—117 XR |
| 3,183,498 | 5/1965 | Midas et al. | 324—117 XR |

WILLIAM F. LINDQUIST, Primary Examiner

ERNEST F. KARLSEN, Assistant Examiner